United States Patent
Kwak et al.

(10) Patent No.: US 9,998,940 B2
(45) Date of Patent: Jun. 12, 2018

(54) DEVICE-TO-DEVICE COMMUNICATION METHOD AND APPARATUS FOR USE IN WIRELESS COMMUNICATION SYSTEM

(71) Applicant: Samsung Electronics Co., Ltd., Gyeonggi-do (KR)

(72) Inventors: Yongjun Kwak, Gyeonggi-do (KR); Youngbum Kim, Seoul (KR); Hyoungju Ji, Seoul (KR); Sangmin Ro, Seoul (KR)

(73) Assignee: Samsung Electronics Co., Ltd (KR)

( * ) Notice: Subject to any disclaimer, the term of this patent is extended or adjusted under 35 U.S.C. 154(b) by 80 days.

(21) Appl. No.: 14/249,026

(22) Filed: Apr. 9, 2014

(65) Prior Publication Data

US 2014/0301228 A1 Oct. 9, 2014

(30) Foreign Application Priority Data

Apr. 9, 2013 (KR) .................. 10-2013-0038565
Mar. 21, 2014 (KR) .................. 10-2014-0033669

(51) Int. Cl.
*H04W 24/10* (2009.01)
*H04W 8/00* (2009.01)
(Continued)

(52) U.S. Cl.
CPC .......... *H04W 24/10* (2013.01); *H04W 8/005* (2013.01); *H04W 72/082* (2013.01); *H04W 76/023* (2013.01)

(58) Field of Classification Search
CPC ... H04W 24/10; H04W 8/005; H04W 72/082; H04W 76/023
See application file for complete search history.

(56) References Cited

U.S. PATENT DOCUMENTS

2010/0261469 A1   10/2010   Ribeiro et al.
2011/0258313 A1   10/2011   Mallik et al.
(Continued)

FOREIGN PATENT DOCUMENTS

CN   102714861   10/2012
CN   102972050   3/2013
(Continued)

OTHER PUBLICATIONS

Klaus Doppler et al., "Device-to-Device Communications; Functional Prospects for LTE-Advanced Networks", IEEE International Conference on Communications Workshops, Jun. 14, 2009, 6 pages.
(Continued)

*Primary Examiner* — Michael Thier
*Assistant Examiner* — Kent Krueger
(74) *Attorney, Agent, or Firm* — The Farrell Law Firm, P.C

(57) ABSTRACT

Methods and apparatuses are provided for Device-to-Device (D2D) communication in a wireless communication system. A terminal receives a D2D communication initiation message from a base station. The terminal measures strength of a received signal on a radio resource predetermined for use in the D2D communication. The terminal transmits a measurement report of the strength of the received signal to the base station. The terminal receives allocation of a resource in the radio resource for transmitting a discovery signal to another terminal for the D2D communication from the base station.

30 Claims, 12 Drawing Sheets

(51) Int. Cl.
*H04W 72/08* (2009.01)
*H04W 76/02* (2009.01)

(56) References Cited

U.S. PATENT DOCUMENTS

| | | |
|---|---|---|
| 2012/0015607 A1 | 1/2012 | Koskela et al. |
| 2012/0106517 A1 | 5/2012 | Charbit et al. |
| 2012/0322484 A1 | 12/2012 | Yu et al. |
| 2013/0012221 A1 | 1/2013 | Zou et al. |
| 2013/0029713 A1 | 1/2013 | Jang et al. |
| 2013/0051277 A1 | 2/2013 | Hakola et al. |
| 2014/0056220 A1* | 2/2014 | Poitau ............... H04W 40/246 370/328 |
| 2014/0064203 A1* | 3/2014 | Seo ..................... H04W 28/06 370/329 |
| 2014/0185495 A1* | 7/2014 | Kuchibhotla ....... H04W 76/023 370/281 |

FOREIGN PATENT DOCUMENTS

| | | |
|---|---|---|
| WO | WO 2010/082084 | 7/2010 |
| WO | WO 2011/098128 | 8/2011 |
| WO | WO 2013/025057 | 2/2013 |

OTHER PUBLICATIONS

Klaus Doppler et al.,"Device-to-Device Communication as an Underlay to LTE-Advanced Networks", IEEE Communications Magazine, Dec. 1, 2009, 8 pages.
European Search Report dated Oct. 25, 2016 issued in counterpart application No. 14782989.9-1854, 9 pages.
Chinese Office Action dated Mar. 5, 2018 issued in counterpart application No. 201480020236.X, 17 pages.

* cited by examiner

DEVICE-TO-DEVICE COMMUNICATION METHOD AND APPARATUS FOR USE IN WIRELESS COMMUNICATION SYSTEM

PRIORITY

This application claims priority under 35 U.S.C. § 119(a) to applications filed in the Korean Intellectual Property Office on Apr. 9, 2013 and Mar. 21, 2014, and assigned Serial Nos. 10-2013-0038565 and 10-2014-0033669, respectively, the content of each of which is incorporated herein by reference.

BACKGROUND OF THE INVENTION

1. Field of the Invention

The present invention relates generally to a Device-to-Device (D2D) communication method and apparatus for use in a wireless communication system and, in particular, to terminal transmission power control and diversity procedures, base station operations in correspondence thereto, and devices therefor in a system where D2D communication and Wireless Local Area Network (WLAN) communication technologies coexist.

2. Description of the Related Art

As wireless communication services diversify, there is a need to support newly introduced services more efficiently and, as a consequence, many researches and developments on new methodologies and techniques are being conducted for use in the wireless communication system.

D2D communication allows a terminal to communicate directly with another nearby terminal. Using D2D communication, the terminal discovers the other terminal and performs direct communication with the terminal if necessary.

D2D communication is advantageous in radio resource utilization efficiency due to the use of small amount of radio resource as compared to communication via a base station. Also, since nearby terminal discovery is supported, it is possible to provide a target terminal with information that efficiently supports an advertisement service and a Social Networking Service (SNS).

However, D2D communication technology has been raised as a serious concern with respect to Long Term Evolution-Advanced (LTE-A).

SUMMARY OF THE INVENTION

The present invention has been made to address at least the above problems and/or disadvantages and to provide at least the advantages described below.

Accordingly, an aspect of the present invention provides a method and apparatus of allocating radio resource for a base station to transmit discovery signal to the terminals for D2D communication.

In accordance with an aspect of the present disclosure, a method is provided for D2D communication in a terminal of a wireless communication system. The terminal receives a D2D communication initiation message from a base station. The terminal measures strength of a received signal on a radio resource predetermined for use in the D2D communication. The terminal transmits a measurement report of the strength of the received signal to the base station. The terminal receives allocation of a resource in the radio resource for transmitting a discovery signal to another terminal for the D2D communication from the base station.

In accordance with another aspect of the present disclosure, a method is provided for supporting D2D communication in base station of a wireless communication system. The base station transmits a D2D communication initiation message to a terminal. The base station receives a measurement report of strength of a received signal at the terminal on a radio resource predetermined for use in the D2D communication from the terminal. The base station allocates a resource in the radio resource for transmitting a discovery signal from the terminal to another terminal for the D2D communication.

In accordance with another aspect of the present disclosure, a terminal is provided for D2D communication in a wireless communication system. The terminal includes a transceiver configured to transmit and receive signals to and from a base station and other terminals. The terminal also includes a controller configured to control to receive a D2D communication initiation message from the base station, measure strength of a received signal on a radio resource predetermined for use in the D2D communication, transmit a measurement report of the strength of the received signal to the base station, and receive allocation of a resource in the radio resource for transmitting a discovery signal to another terminal for the D2D communication from the base station.

In accordance with still another aspect of the present invention, a base station is provided for supporting D2D communication in a wireless communication system. The base station includes a controller configured to control to receive a D2D communication initiation message from the base station, measure strength of a received signal on a radio resource predetermined for use in the D2D communication, transmit a measurement report of the strength of the received signal to the base station, and receive allocation of a resource in the radio resource for transmitting a discovery signal to another terminal for the D2D communication from the base station.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
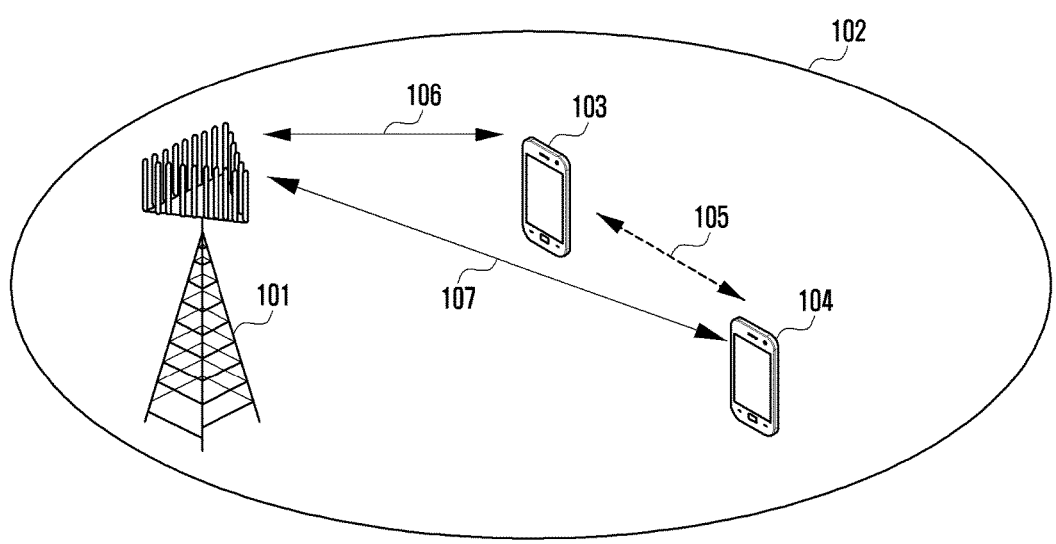
FIG. 1 is a diagram illustrating D2D communication in a cellular communication system.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Although the description is directed to an OFDM-based radio communication system, particularly the 3rd Generation Partnership Project (3GPP) Evolved Universal Mobile Telecommunications System (UMTS) Terrestrial Radio Access (EUTRA), it will be understood by those skilled in the art that the present disclosure can be applied to other communication systems having a similar technical background and channel format, with a slight modification, without departing from the spirit and scope of the present invention.

In the following description, the terms base station, eNB, and cell may be used interchangeably and have the same meaning. Also, the terms terminal and UE may be used interchangeably and have the same meaning. The term D2D communication may include the operation of discovering nearby terminals and the operation of communication directly between the terminals.

FIG. 1 is a diagram illustrating D2D communication in a cellular communication system.

Referring to FIG. 1, an eNB 101 controls UEs 103 and 104 located in a cell 102 defining the signal transmission range of the eNB 101. Specifically, the UE 103 is performing cellular communication with the eNB 101 through a UE-eNB link 106, and the UE 104 is performing cellular communication with the eNB 101 through a UE-eNB link 107. If both the UEs 103 and 104 support D2D communication, they can directly exchange information through D2D link 105, without participation of eNB 101.

D2D communication using the cellular mobile communication system, such as, for example, the LTE-A system, is basically comprised of a UE discovery procedure and a D2D communication procedure.

The UE discovery procedure includes transmitting, at the UE, a certain discovery signal including its information, and receiving the discovery signals transmitted by other UEs simultaneously. The UE receives the signals from other nearby UEs to acquire the information on the nearby UEs, and utilizes a certain application more efficiently based on the information received from the other UEs.

In an embodiment of the present invention, a user may include advertisement information in the discovery signal broadcast, such that other UEs running the application capable of processing the advertisement receive the discovery signal and present the advertisement carried in the discovery signal. In another embodiment of the present invention, if the UE running an SNS application receives the discovery signal transmitted by a friend registered with the SNS, the SNS application may interpret the information on the UE of the friend and notify the user of the nearby presence of the registered friend.

In order to efficiently use the information included in the discovery signal received by the D2D service application through the discovery procedure, it is preferred that many UEs communicate the discovery signal. That is, as the number of UEs performing the discovery operations increases, the D2D service application is capable of providing more diverse and better quality services.

In the wireless network, such as, for example, the LTE system, the UE receives the cellular communication service in one of the two states. The operation state of the UE is classified into one of a connected mode and an idle mode (or sleep mode). The UE in the connected mode has acquired downlink and uplink synchronizations with the current serving cell so as to perform uplink transmission as well as downlink reception. The cell has information on the UE in the connected mode so as to schedule the uplink transmission or downlink reception of the UE.

Meanwhile, the UE in the idle mode has no data to transmit or receive and maintains only the downlink synchronization with the current serving cell to receive the least information of the serving cell in downlink. The cell has no information on the idle mode UE and does not schedule data in downlink and uplink. The UE discovery procedure for D2D communication is discussed based on the UE operating in the connected mode.

The operation mode of the UE is determined as one of the connected mode and idle mode depending on the activity. Since it is typical that a large number of UEs have a small amount of activity in the cell, they are likely to operate in the idle state rather than the connected state. This means that the ratio of the number of terminals in the connected mode to the number of terminals in the idle mode in a cell is likely to be very low.

In the D2D service, however, as the number of UEs performing the discovery operation increases, the discovery operation efficiency increases. Accordingly, a discussion is provided for the participation of the idle mode UEs in the D2D discovery procedure. As described above, however, the UE in the idle mode is configured to receive but not transmit signals. Furthermore, the serving cell or eNB does not know whether the UE is in the signal range of the serving eNB. Accordingly, it is difficult for the UE in the idle mode to perform D2D discovery operation.

Embodiments of the present propose a method for improving the D2D communication utilization efficiency by allowing the idle mode UE to perform D2D discovery operation.

Figure 2:
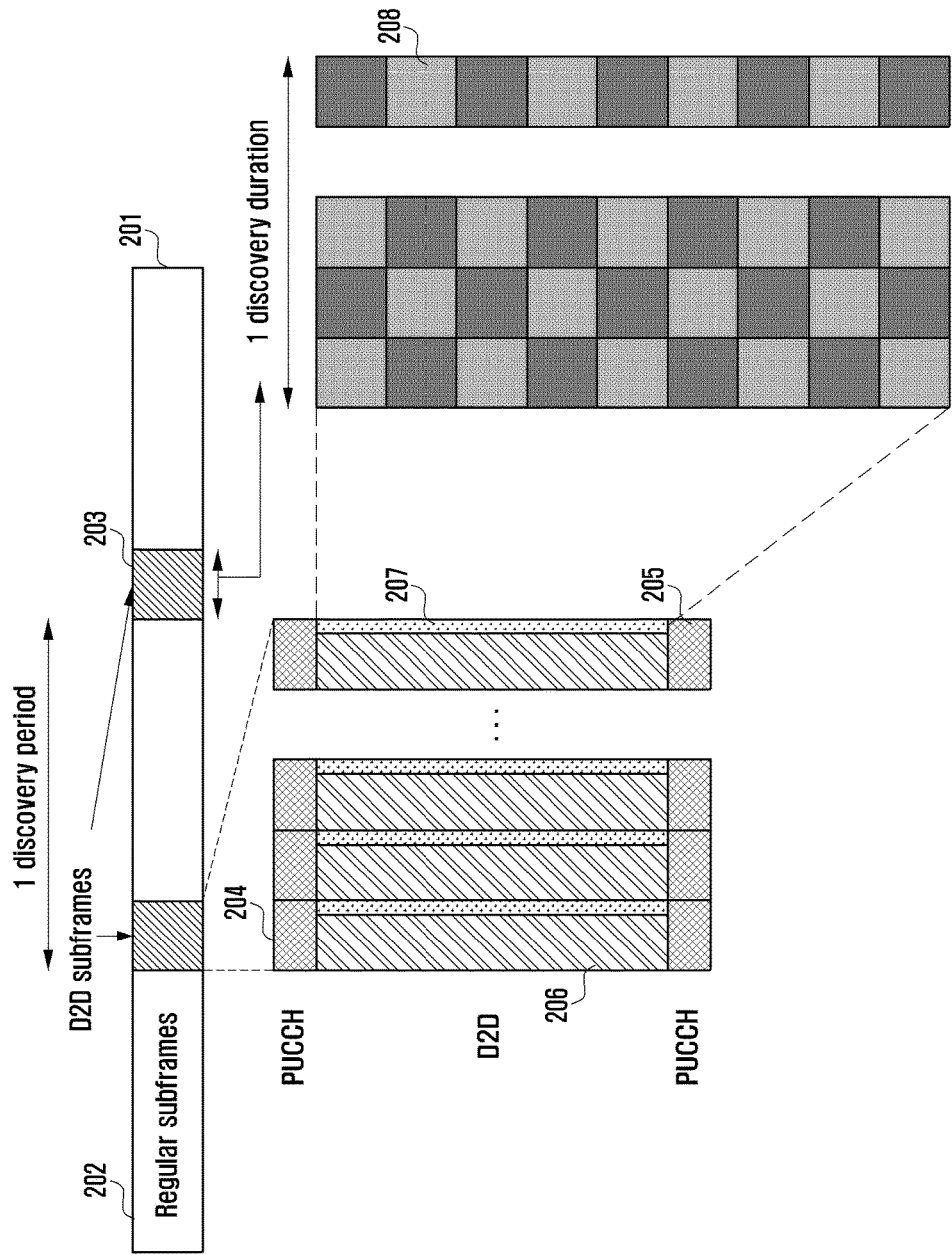
FIG. 2 is a diagram illustrating a structure of a radio resource for D2D communication using an uplink resource in Long Term Evolution (LTE)

FIG. 2 is a diagram illustrating a structure of a radio resource for D2D communication using an uplink resource in LTE. For D2D communication, both the uplink and downlink resources can be used. For convenience, the description is directed to the case where the uplink resource is used for D2D communication, as shown in FIG. 2. However, embodiments of the present invention are not limited to use of a D2D resource.

In FIG. 2, a subframe set 201 denotes a plurality of subframes arranged on a time axis. The subframe is a time unit consisting of a plurality of symbols and spanning 1 ms.

Although this embodiment of the present invention is directed to the subframe for use in LTE, any length of time may be used.

According to an embodiment of the present invention, a part of the subframe set 201 may be used as a D2D resource. Specifically, regular subframes 202 are allocated for cellular communication other than D2D communication, while D2D subframes 203 are allocated for D2D communication. The D2D resource may be allocated repeatedly at every discovery period.

In more detail, the D2D subframes 203 for D2D communication may include several subframes. One subframe consists of a plurality of Orthogonal Frequency Division Multiplexing (OFDM) symbols in the time domain and a plurality of subcarriers in the frequency domain.

As known in the art, the subcarriers positioned at the edges of the bandwidth of LTE uplink resource, as denoted by reference numbers 204 and 205 of FIG. 2, among the subcarriers available on the frequency axis are used for transmitting uplink control information (in LTE, Physical Control Channel (PUCCH)). The uplink control information includes downlink channel status information (Channel Quality Information (CQI)) of the UE, Acknowledgement/ Negative Acknowledgement (ACK/NACK) corresponding to downlink Hybrid Automatic ReQuest (HARM), and Scheduling Request for uplink information transmission. Accordingly, the subcarriers in the middle of the subframe in the frequency domain, with the exception of those arranged at both edges 204 and 205, may be used for D2D communication.

The last OFDM symbol (or Single Carrier-Frequency Division Multiplexing (SC-FDM) symbol) 207 on subcarrier 206 in the subframe may be used for transmitting a Sounding Reference Signal (SRS) necessary for the eNB to estimate uplink channels of the UEs. Since the SRS is transmitted at an interval determined depending on the configuration of the eNB, there may be subframes carrying SRS and a subframe carrying no SRS. The subframe without the SRS may utilize the last symbol 207 for a D2D resource, and when the UE has to perform transmission and reception contiguously by nature of the D2D, the last symbol 207 may be used as the transition time for alternation between transmission and reception.

In FIG. 2, in order to transmit the discovery signal on the D2D resource 203, an appropriate multiplexing scheme may be applied such that a plurality of UEs can use the resource allocated for D2D communication. In an embodiment of the present invention, the resource 204 may be split into a grid of a plurality of unit resources on the time and frequency axes, such that each UE is allocated the resource in square units of the grid for discovery signal transmission.

Each of the UEs allocated resources from the eNB transmits its discovery signal using the allocated resource, and receives the discovery signals transmitted by other UEs on the resources, with the exception of the resource allocated to it to discover other UEs.

Although embodiments of the present invention are directed to the multiplexing of the discovery signals of the multiple UEs on resource grid splitting the D2D resource in time-frequency division multiplexing manner as shown in FIG. 2, the present invention is not limited thereto and may be embodied using various multiplexing schemes such as, for example, Frequency Division Multiplexing (FDM), Time Division Multiplexing (TDM), Code Division Multiplexing (CDM), or any combination thereof.

Figure 3:
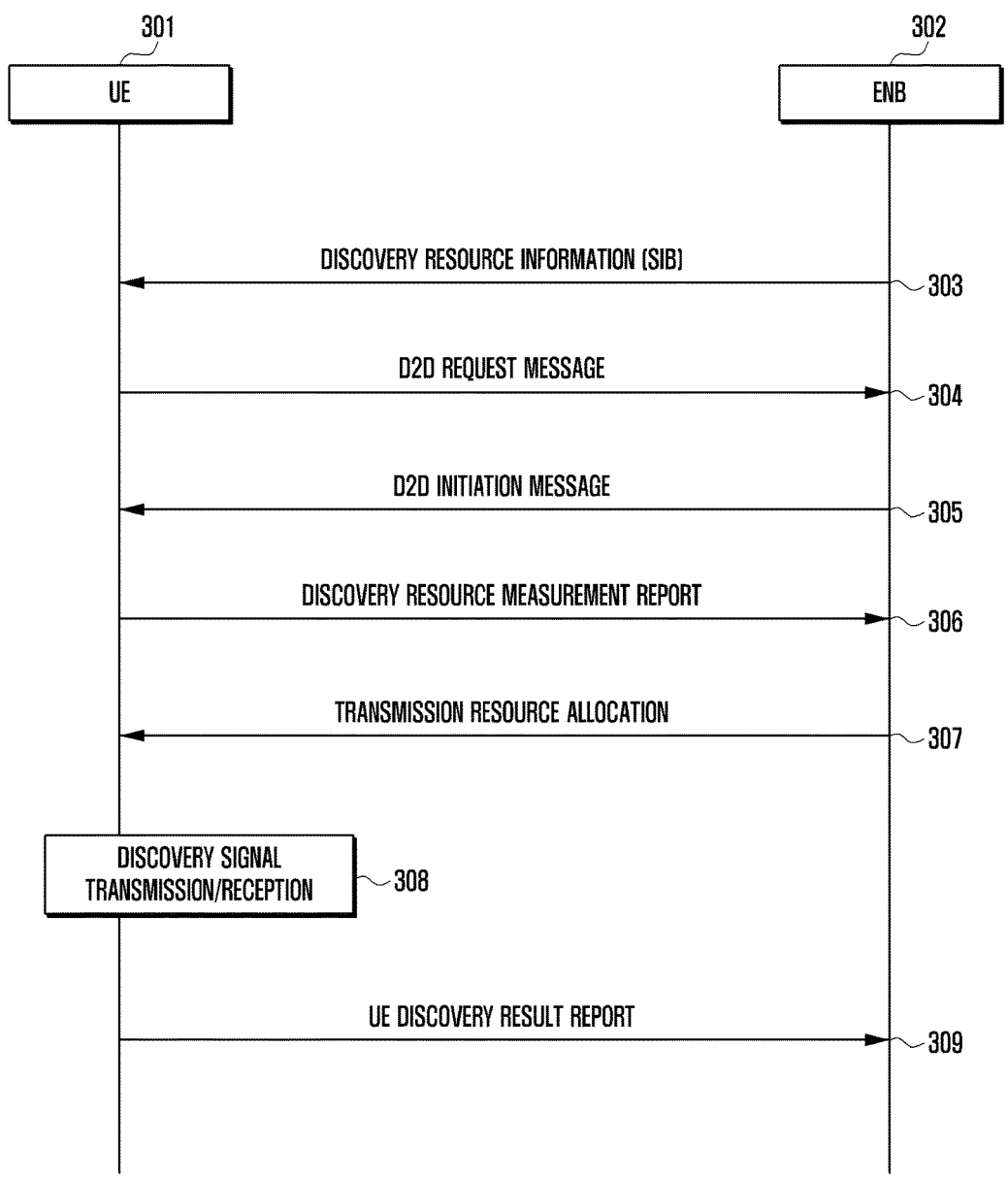
FIG. 3 is a signal flow diagram illustrating a D2D procedure between the UE and the eNB.

FIG. 3 is a signal flow diagram illustrating a D2D procedure between the UE and the eNB.

Referring to FIG. 3, UE 301 receives information on an entire radio resource for receiving the D2D discovery signal from an eNB 302 (hereinafter, referred to as a D2D resource or discovery resource), in step 303. The information on the D2D resource may be included in a System Information Block (SIB) broadcast in the cell, may be transmitted through higher layer signaling, or may be provided using other methods. When the UE 301 has D2D radio resource information already, step 303 may be omitted. When the UE 301 does not have the information on the D2D radio resource, the eNB 302 may send the UE 301 the D2D resource information in response to a request of the UE 301.

If the D2D service is commenced, the UE 301 sends the eNB 302 a D2D request message, in step 304. In response to the D2D request message, the eNB 302 sends the UE 301 a D2D initiation message to accept the D2D operation of the UE 301, in step 305. The D2D initiation message may include information on the entire resource for D2D discovery signal transmitted by the UE 301, in which case, step 303 may be omitted.

The eNB 302 is capable of commanding the UE 301 to initiate D2D communication without a request of the UE 301, in which case, step 304 may be omitted. If the D2D operation is accepted by the eNB 302, the UE 301 checks the signals received on the discovery signal resources formed by splitting the entire radio resource into a grid, and measures the received signal strengths at the individual discovery signal resources multiplexed on the entire resource. The UE 301 measures the received signal strength to determine the current discovery signal resource having the least received signal strength for transmitting its discovery signal.

In detail, the UE 301 measures the received signal strength by square 208 of the grid of FIG. 2, i.e., per discovery signal resource, and stores the received signal strength per D2D radio resource. The UE 301 reports the received signal strength information measured per discovery signal resource to the eNB 302, in step 306. The information reported to the eNB 302 may include at least one of the followings:

1. Received signal strengths of all discovery signal resources (in order of discovery signal resource indices);

2. Index numbers of a predetermined number of discovery signal resources in an ascending order of the received signal strengths;

3. Indices and received signal strengths of predetermined number of discovery signal resources in an ascending order of the received signal strength;

4. Information on the discovery signal resource of which received signal strength is less than a predetermined threshold value (bitmap can be used); and 5. Predetermined number of discovery signal resources with low received signal strength (bitmap can be used).

The eNB 302 allocates an appropriate discovery signal resource to each UE based on the measurement report on the discovery signal resource information of the UE and the discovery signal resource information report of other UEs within the cell. In step 307, the eNB 302 sends the UE 301 the information on the discovery signal resource for use in discovery signal transmission of the UE 301. The discovery signal resource allocation information may be transmitted through higher layer signaling or physical layer signaling.

In step 308, the UE 301 transmits its unique discovery signal using the allocated discovery signal resource, and receives discovery signals transmitted by other UEs using discovery signal resources that remain after subtracting the allocated resource from the entire D2D resource. The discovery signal received from another UE may be reported to the eNB, in step 309.

Although the UE 301 is allocated the discovery signal resource having the least received signal strength through the above described procedure, interference at the allocated resource may increase due to a change in conditions of neighboring cells and/or locations of other UEs. Accordingly, although the discovery signal resource is allocated, the UE 301 may perform received signal strength measurement on the entire D2D resource and report the measurement result to the eNB 302, such that the eNB 302 performs reallocation of the discovery signal resource to the UE 301 based on the reported information. Specifically, steps 306 and 307 of FIG. 3 may be performed periodically or in response to the request of the eNB 302 or the UE 301. In this case, the UE 301 cannot transmit its discovery signal during one D2D discovery period as shown in FIG. 2, but can only receive signals to measure the received signal strength.

As described above, the UE initiates D2D through signaling with the eNB and other operations, and is allocated the resource for transmitting the discovery signal. The UE must be in the connected mode for signaling with the eNB. Specifically, the UE in the idle mode or non-connected mode cannot perform bidirectional communication with the eNB, and it is difficult to perform the procedure for being allocated the resource for discovery signal transmission from the eNB.

Accordingly, an embodiment of the present invention provides a method for allowing the UE in the idle mode to transmit and receive discovery signals for D2D communication.

In an embodiment of the present invention, a discovery signal transmission procedure is performed when the D2D UE in the connected mode is allocated the discovery signal transmission resource from the eNB and then transitions to the idle mode.

According to this embodiment of the present invention, the UE in the connected mode is allocated the resource for transmitting the discovery signal for D2D service through signaling with the eNB, and transmits the discovery signal using the allocated resource. If it is determined that there is no need for bidirectional communication with the eNB, the UE may enter the idle mode but it can continue process the D2D service in the idle mode.

Accordingly, even when the UE transitions from the connected mode to the idle mode, the UE constantly transmits the discovery signal using the resource previously allocated by the eNB while in the connected mode. Specifically, the UE is capable of transmitting the discovery signal using the same resource in both the connected and idle modes.

The UE in the idle mode may move to a cell under the control of another eNB. The UE in the idle mode can receive downlink information from the eNB and, if a Master Information Block (MIB) as the representative system information, System Information Block (SIB), and the information to be transmitted from the eNB to the UE, it can receive the paging information transmitted first. When the UE in the idle mode moves such that the eNB changes, it reads the MIB and SIB information to perform cell selection. The cell selection procedure selects a cell for transmitting the paging signal, and the eNB does not know which cell the UE selects.

Meanwhile, the D2D service may operate with a plurality of cells or eNBs with which synchronization is acquired as well as within a signal cell. It may be assumed that the synchronized eNBs have acquired synchronization with the UEs within their cells, and this facilitates providing D2D service among the eNBs. However, since the UEs within the coverage areas of the unsynchronized eNBs cannot acquire common synchronization, it is difficult to receive the D2D service among these eNBs.

In this embodiment of the present invention, a plurality of eNBs capable of commonly supporting D2D service are sorted into one D2D region, such that the UE uses the discovery signal resource allocated previously within the D2D region even when the serving cell of the UE changes.

Figure 4:
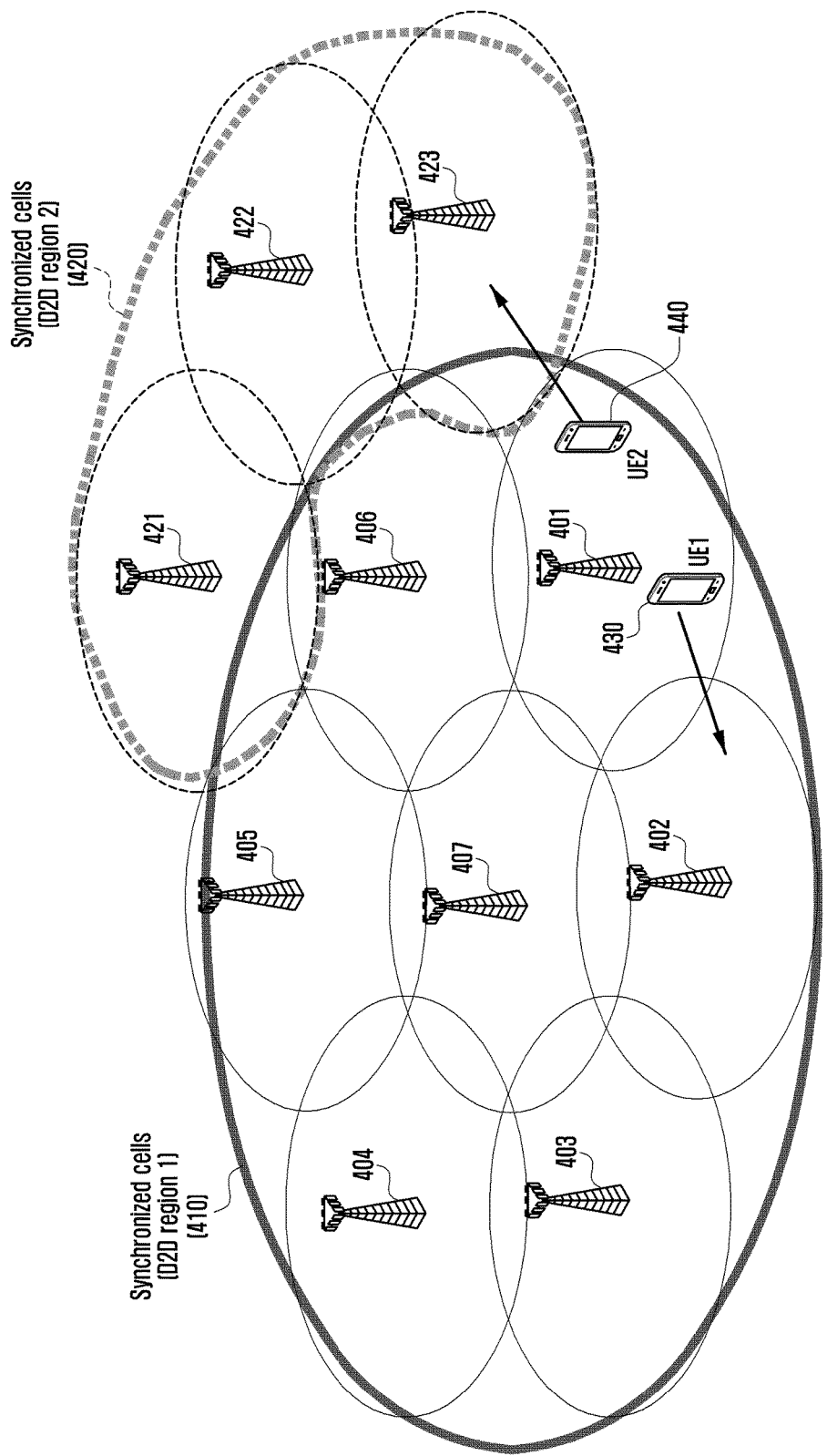
FIG. 4 is a diagram illustrating a D2D region comprised of synchronized cells, according to an embodiment of the present invention.

FIG. 4 is a diagram illustrating a D2D region comprised of synchronized cells, according to an embodiment of the present invention. Referring to FIG. 4, eNBs 401, 402, 403, 404, 405, 406 and 407 are in the synchronized state so as to constitute a D2D region 1 410. All of the UEs located within the D2D region 1 410 may receive the same D2D service, and transmit and receive discovery signals. Specifically, a UE located within the coverage of the eNB 404 may also discover a UE located within the coverage of the eNB 401.

Meanwhile, eNBs 421, 422, and 423 form a D2D region 2 420 independently of the D2D region 1 410. The reason for forming the separate D2D region is because it is difficult to provide the D2D service between the set of eNBs 401, 402, 403, 404, 405, 406, and 407 and another set of eNBs 421, 422, and 423 due to the non-synchronization therebetween. For example, UEs located within the coverage of the eNB 421 may receive a discovery signal of a UE located within the coverage of the eNB 422. However, the UE located within the coverage of the eNB 421 cannot receive a discovery signal of a UE located within the coverage of the eNB 405. Meanwhile, The eNBs may be sorted into different D2D regions for reasons other than eNB synchronization, e.g., eNB location or operator's intention.

All of the eNBs belonging to one D2D region may commonly use an entire resource for discovery signal transmission. That is, the eNBs 401, 402, 403, 404, 405, 406 and 407 belonging to the D2D region 1 410 share the entire discovery signal resource, which is different from the discovery signal resource shared by the eNBs 421, 422, and 423 belonging to the D2D region 2 420.

In providing the D2D service by D2D region, when the UE in the idle mode moves and changes the eNB through cell reselection, the UE may constantly use the discovery signal transmission resource allocated in the previous connected mode depending on the D2D region to which the newly selected eNB belongs.

In detail, if a UE 1 430 in the idle mode, which transmits the discovery signal using the resource allocated by the eNB 401, moves to the eNB 402, the UE 1 430 can constantly use the same discovery signal resource because the eNBs 401 and 402 belong to the same D2D region 1 410.

However, if a UE 2 440 in the idle mode, which is transmitting the discovery signal using the resource allocated by the eNB 401, moves to the eNB 423, the UE 2 440 cannot use the same discovery signal resource any longer because the two eNBs belongs to different D2D regions, i.e. the eNB 401 belongs to the D2D region 1 410 and the eNB 423 the D2D region 2 420.

In this embodiment of the present invention, the eNB notifies the UE of predefined D2D region information in an SIB in order for the UE to determine whether the UE can transmit the discovery signal constantly depending on the D2D region to which the eNB belongs.

Figure 5:
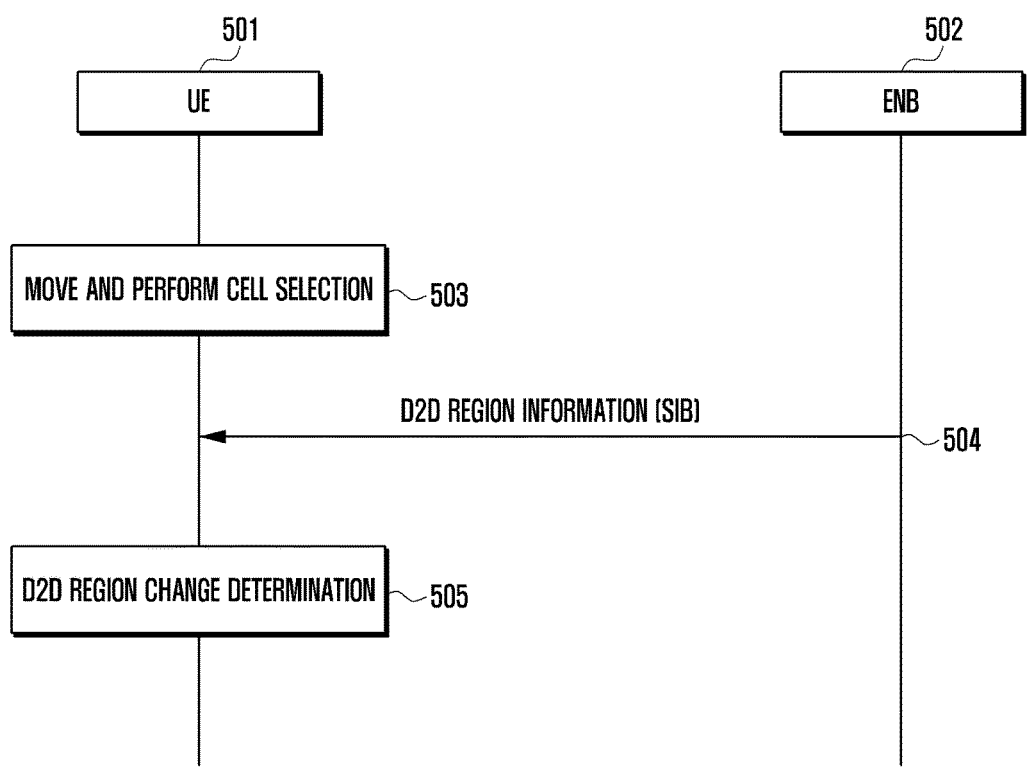
FIG. 5 is a diagram illustrating a procedure for an enhanced NodeB (eNB) to notify a User Equipment (UE) of D2D region information, according to an embodiment of the present invention.

FIG. 5 is a diagram illustrating a procedure for the eNB to notify the UE of D2D region information, according to an embodiment of the present invention. Referring to FIG. 5, an eNB 502 supporting D2D communication includes the D2D region information in the SIB broadcast, such that UEs within its coverage receive the D2D region information. The D2D region information may be an indicator allocated for the D2D region in advance and shared by all of the eNBs and UEs or any of all the types of information capable of being used for discriminating among D2D regions.

If a UE 501 in the idle mode moves to select a new cell, in step 503, e.g., if the UE 430 moves from the eNB 401 to the eNB 402 in FIG. 4, the UE 501 receives the SIB including D2D region information from the eNB 502, in step 504. Afterward, the UE determines whether the D2D region has changed in step 505. If the D2D region has not changed, the eNB 501 constantly transmits the discovery signal using the previously allocated resource. Referring to FIG. 4, since the eNBs 401 and 402 have the same D2D region information, the UE 430 is capable of constantly transmitting the discovery signal using the previously allocation resource.

Meanwhile, if the UE 440 moves from the eNB 401 to the eNB 423 in FIG. 4, the UE receives the SIB including D2D region information from the eNB 423 to determine that the D2D region information of the eNBs 401 and 423 mismatch. In this case, the UE 501 cannot continue transmitting the discovery signal using the previously allocated resource.

In another embodiment of the present invention, although the eNB does not include any D2D region information in SIB broadcast, if the SIB includes the information on the entire resource for D2D discovery signal, the UE in the idle mode is capable of comparing the old cell and the new cell based on the information on the entire resource for D2D discovery signal. If the resource information matches, the UE determines that the eNBs belong to the same D2D region and, otherwise, that the eNBs belong to different D2D regions.

Figure 6:
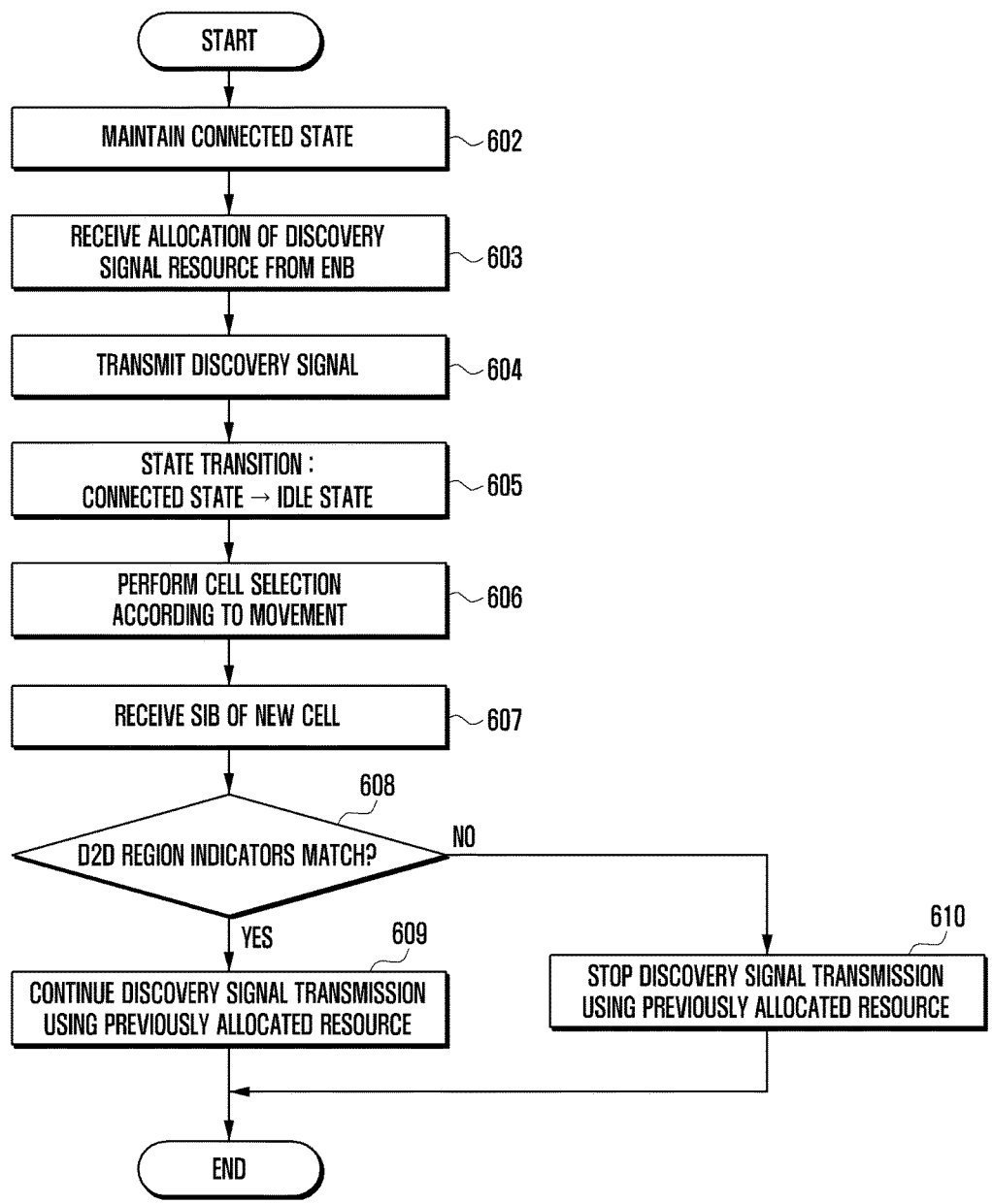
FIG. 6 is a flowchart illustrating the UE procedure for initiating D2D communication when the UE is allocated a discovery signal resource, transitions to the idle mode, and moves to a new eNB, according to an embodiment of the present invention.

FIG. 6 is a flowchart illustrating the UE procedure for initiating D2D communication in the case where the UE is allocated discovery signal resource, transitions to the idle mode, and moves to a new eNB, according to an embodiment of the present invention.

Referring to FIG. 6, the UE initiated D2D operation enters the connected mode, in step 602, and is allocated a discovery signal resource for transmitting the discovery signal from the eNB according to the procedure depicted in FIG. 3, in step 603.

The UE transmits the discovery signal using the allocated discovery signal resource, in step 604. If there is no signal to transmit to or receive from the eNB, the UE transitions from the connected mode to the idle mode, in step 605. The UE in the idle mode moves to a new eNB and performs cell selection, in step 606. If a new cell is selected, the UE receives an SIB from the new cell, in step 607.

The UE checks the D2D region indicator in the SIB of the new cell and determines whether the D2D region indicators of the old and new cells match, in step 608. If the D2D region indicators of the old and new cells match, the UE continues transmitting the discovery signal using the previously allocated resource, in step 609. If the D2D region indicators of the old and new cells mismatch, the UE stops transmitting the discovery signal on the previously allocation resource, in step 610.

As described above, even when the D2D region indicator is not included in the SIB, the D2D region determination step 608 may be performed by analyzing the entire discovery signal resource information included in SIB.

If the D2D region indicators of the old and new cells mismatch and it becomes impossible to transmit the discovery signal on the previously allocated resource, the UE is allocated new resource from the new eNB to continue transmitting the discovery signal or the UE ends the D2D service.

Figure 7:
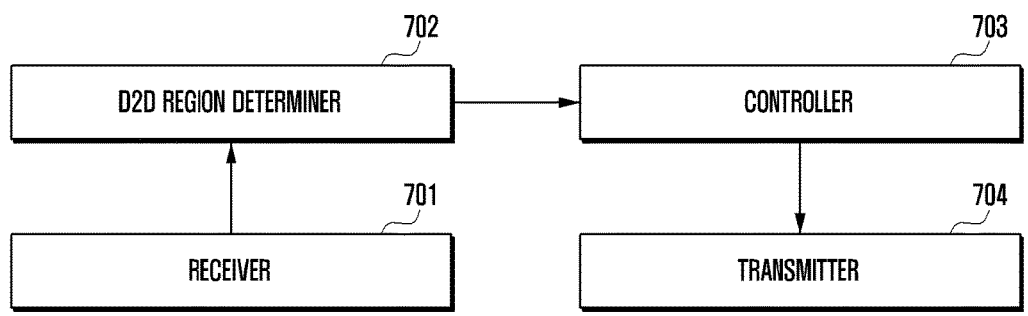
FIG. 7 is a block diagram illustrating a configuration of the UE, according to an embodiment of the present invention.

FIG. 7 is a block diagram illustrating a configuration of the UE, according to an embodiment of the present invention. Referring to FIG. 7, the UE includes a receiver 701, a D2D region determiner 702, a controller 703, and a transmitter 704. FIG. 7 shows only the essential components of the UE according to this embodiment of the present invention. The separation of components are shown as an example, and the controller 703 may include the D2D region determiner 702 and other components associated with the functions of the UE.

The UE receives the SIB from the eNB by means of the receiver 701, and reads the D2D region indicator included in the SIB by means of the D2D region determiner 702 to determine whether the new D2D region matches the old D2D region. The determination result is input to the controller 703, and the controller 703 determines the resource for use in transmitting the discovery signal and controls the transmitter 704 to transmit the discovery signal.

In another embodiment of the present invention, a method is provided for distinctly allocating a discovery signal resource depending on whether the UE is in the connected mode or the idle mode.

According to this embodiment of the present invention, the UE in the connected mode measures received signal strength on the entire discovery signal resource and reports the measurement result to the eNB, as described above with respect to FIG. 3, such that the eNB allocates the discovery signal resource for transmitting the discovery signal. As described above, the received signal power measurement and resource allocation may be performed periodically.

However, the UE in the idle mode cannot be allocated the resource from the eNB through the signaling as shown in FIG. 3. In this embodiment of the present invention, the UE monitors the entire discovery signal resource to detect the received signal periodically, checks the received signal strengths on the individual discovery signal resources multiplexed on the entire discovery signal resource, and selects the resource having the lowest received signal strength for use in transmitting the discovery signal of the UE without extra allocation operation of the eNB.

If its operation mode transitions from the connected mode to the idle mode, if a predetermined period, e.g., the received signal measurement period in the connected mode, or a preconfigured period arrives in the state of transmitting the discovery signal using the previously allocated resource, the UE checks the received signal strength on the corresponding resource and changes the resource for transmitting the discovery signal.

If the UE in the idle mode moves to a new eNB, it receives the information on the entire discovery signal resource used in the new cell through the SIB of the new eNB, while staying in the idle mode, and determines the new resource for transmitting the discovery signal.

In another embodiment of the present invention, the entire discovery signal resource is divided into two parts: one for the UE in the connected mode to transmit the discovery signal through resource allocation of the eNB, and the other for the UE in the idle mode to transmit the discovery signal through autonomous resource selection. In this case, the eNB may notify the UE of the entire discovery signal resource, the discovery signal resource for UE in the connected mode, and the discovery signal resource for UE in the idle mode through SIB.

In another embodiment of the present invention, the eNB notifies of the discovery signal resource for the UE in the idle mode through the SIB and the discovery signal resource for the UE in the connected mode through higher layer signaling. If the UE in the idle mode moves to a new cell, it receives the discovery signal resource information for the idle mode UE through SIB, and determines the resource for transmitting its discovery signal based on the corresponding information.

Figure 8:
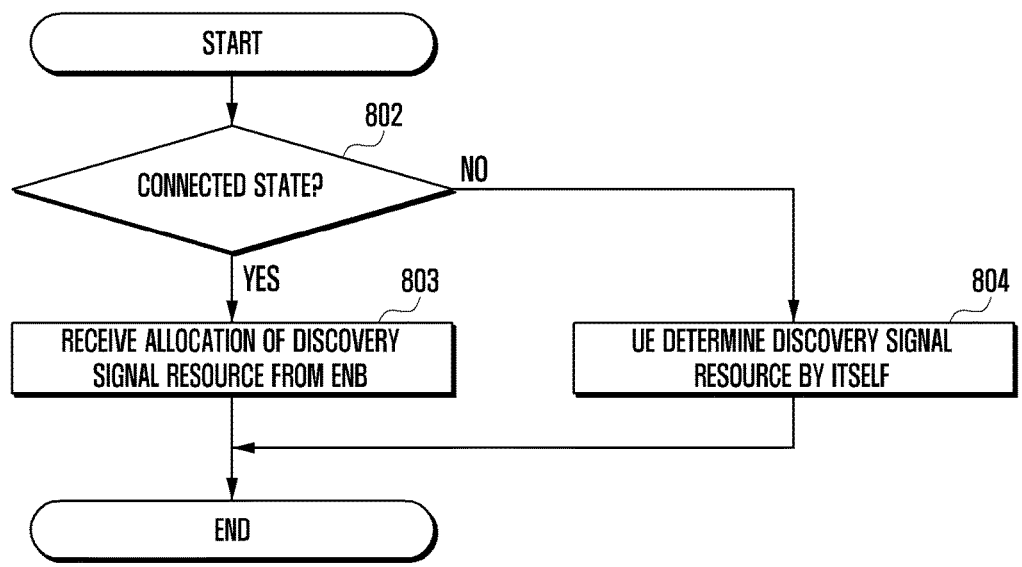
FIG. 8 is a flowchart illustrating the UE procedure for initiating D2D communication, according to another embodiment of the present invention.

FIG. 8 is a flowchart illustrating the UE procedure for initiating D2D communication, according to another embodiment of the present invention.

Referring to FIG. 8, the UE starts the discovery signal resource determination operation at a predetermined signal measurement interval, and determines whether it is in the connected mode, in step 802.

If the UE is in the connected mode, the UE is allocated the discovery signal resource from the eNB through the procedure described above with respect to FIG. 3, in step 803. If the UE is in the idle mode, the UE determines the resource for transmitting the discovery signal autonomously in the entire D2D radio resource or the radio resource reserved for the UEs in the idle mode, in step 804.

Figure 9:
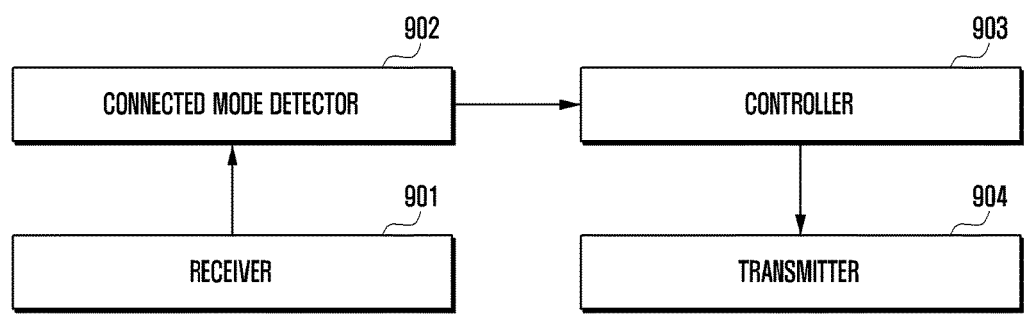
FIG. 9 is a block diagram illustrating a configuration of the UE, according to another embodiment of the present invention.

FIG. 9 is a block diagram illustrating a configuration of the UE, according another embodiment of the present invention. As shown in FIG. 9, the UE includes a receiver 901, a connected mode detector 902, a controller 903, and a transmitter 904. FIG. 9 only shows essential components of the UE according to this embodiment of the present invention. the components are illustrated separately as an example, but the controller 903 may include the connected mode detector 902 and other components associated with the functions of the UE.

The UE receives an SIB from the eNB by means of the receiver 901 and determines whether it is in the connected mode by means of the connected mode detector 902. The determination result on whether it is in the connected mode or the idle mode is input to the controller 903, such that the controller 903 determines the resource for use in transmitting the discovery signal and controls the transmitter 904 to transmit the discovery signal.

According to another embodiment of the present invention, a method is provided for the eNB to efficiently use the discovery signal resource. The eNB determines the entire available resource for the discovery signal of the D2D service, and notifies the UEs within the cell of the information on the resource through the SIB. This embodiment of the present invention specifies eNB operations for determining the entire available resource for discovery signal transmission.

As described above, since the eNB has no information on the UEs in the idle mode, if the number of UEs operating in the idle mode increases, many UEs transmit discovery signals on the constrained discovery signal resource so as to cause interference, resulting in degradation of D2D discovery operation performance.

In order to solve this problem, the eNB performs received interference power measurement operation on the entire available resource of discovery signal periodically. This embodiment of the present invention works very efficiently on the discovery signal resource in uplink and in downlink. The eNB determines the received signal strength on the current available resource through received signal power measurement on the entire D2D radio resource, and predicts how many UEs are transmitting discovery signals. The eNB may adjust the entire discovery signal resource based on the prediction result.

Figure 10:
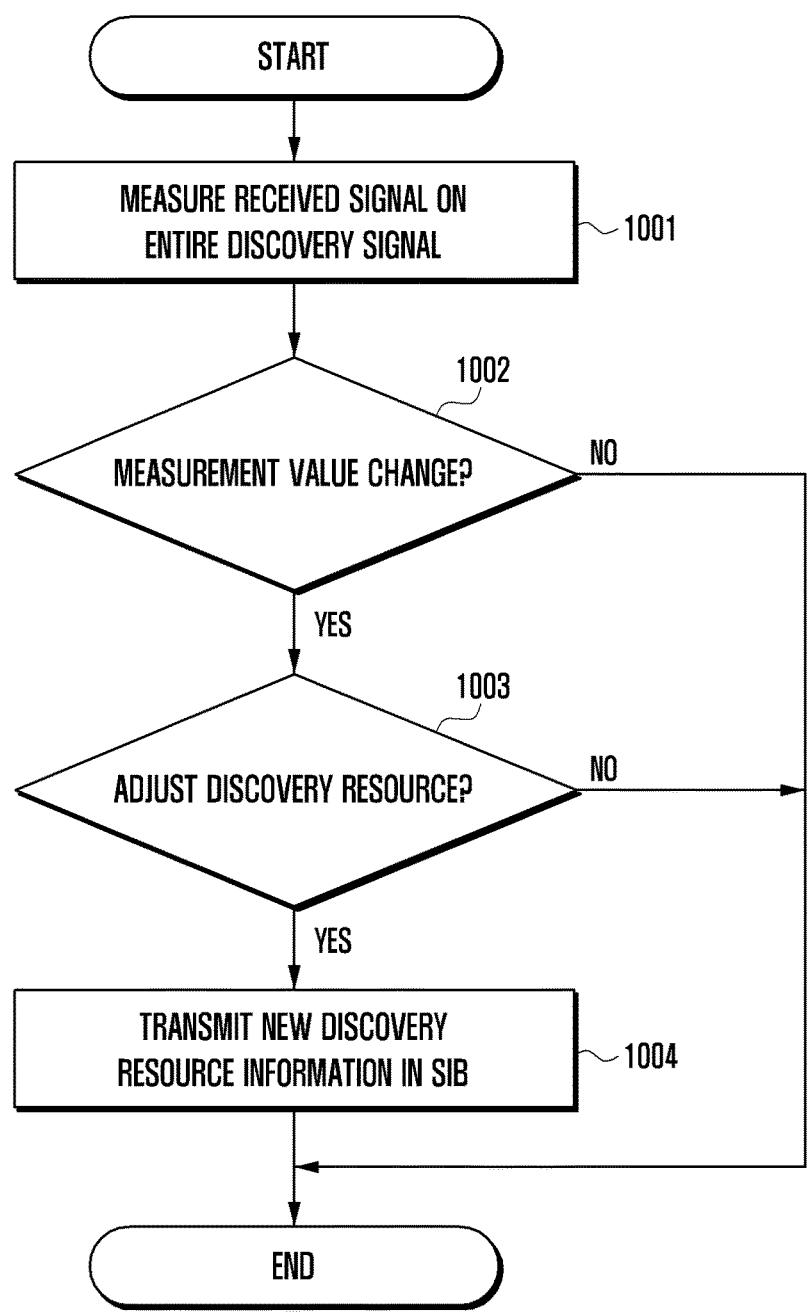
FIG. 10 is a flowchart illustrating the eNB procedure for initiating D2D communication, according to an embodiment of the present invention.

FIG. 10 is a flowchart illustrating the eNB procedure for initiating D2D communication, according to an embodiment of the present invention.

Referring to FIG. 10, the eNB measures the received signal power on the entire currently configured discovery signal resource, in step 1001. The eNB determines whether the measured received signal power value has changed, in step 1002. If the measurement value changes more than a predetermined threshold amount, it is determined that the measurement value has changed.

If it is determined that the measurement value has changed, the eNB determines whether to adjust the amount of the entire discovery signal resource, in step 1003. If it is determined to adjust the amount, the eNB transmits the information on the changed discovery signal resource through the SIB, in step 1004. Typically, if the received signal power value increases, the eNB increases the entire discovery signal resource amount, and if the received signal power value decreases, the eNB decreases the entire discovery signal resource amount. If it is determined that the measurement value has not changed in step 1002, or it is determined not to adjust the amount in step 1003, the procedure terminates.

Figure 11:
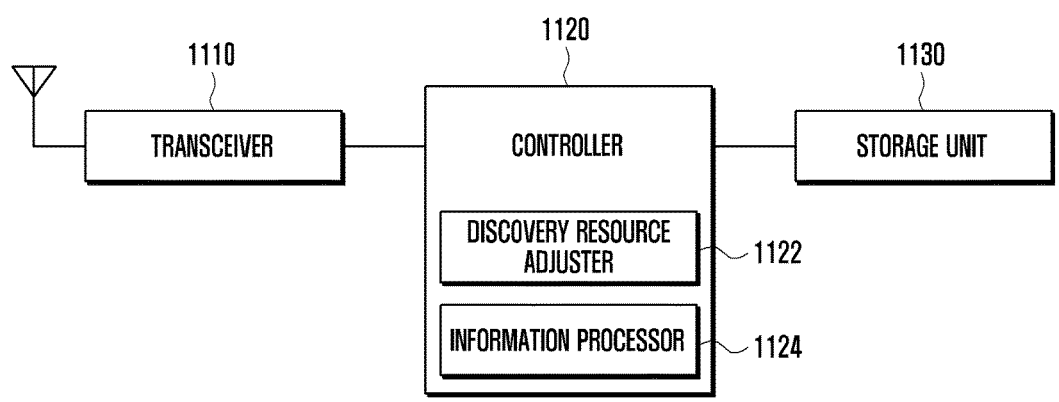
FIG. 11 is a block diagram illustrating a configuration of the eNB, according to an embodiment of the present invention.

FIG. 11 is a block diagram illustrating a configuration of the eNB, according to an embodiment of the present invention. Referring to FIG. 11, the eNB includes a transceiver 1110, a controller 1120, and a storage unit 1130.

According to another embodiment of the present invention, a method is provided for the eNB to efficiently use the discovery signal resource. The eNB determines the entire resource available for the discovery signal to provide the D2D service, and notifies the UEs within the cell of the information on the determination result. This embodiment of the present invention specifies the UE procedure of generating UE D2D resource status information necessary for use in determining the entire available resource for the discovery signal and reporting the generated UE D2D resource status information to the eNB.

As described above, the eNB has no information on the UE in the connected and thus, if the number of idle mode UEs increases, many UEs transmit discovery signals on the constrained discovery signal resource so as to cause interference, resulting in degradation of D2D discovery operation performance.

In order to solve this problem, the eNB receives the D2D resource status information from the UEs. Since this information has to be transmitted from the UE to the eNB, only the D2D UEs in the connected mode transmit the D2D resource status information to the eNB. The conditions in which the UE in the connected mode transmits the D2D resource status information or the UE in the idle mode transitions to the connected mode to transmit the D2D resource status information are as follows:

1. Transmit at an interval (the interval may be set to a predetermined value or notified to the UE through SIB or RRC signaling);

2. When the received signal power displacement of the entire D2D resource is equal to or greater than of a predetermined value; and 3. The number of discovered D2D UEs increases to be equal to or greater than a predetermined value or decreases to be equal to or less than a predetermined value.

The eNB may adjust the amount of the entire discovery signal resource based on the D2D resource status information transmitted by the UEs. The D2D resource status information transmitted from the UE to the eNB may include at least one of the following:

1. Number of UEs discovered by UE;
2. Received signal power information of entire D2D resource; and
3. Received signal power information per individual discovery resource in D2D resource:
   A. received signal power information on entire discovery resource,
   B. received signal power information on the largest number of discovery resources (the number of resources may be predetermined or notified through higher signaling or physical layer signaling),
   C. received signal power information on the smallest number of discovery resource (the number of resources may be predetermined or notified through higher signaling or physical layer signaling), and
   D. received signal power information on some discovery resources according to other conditions.

Figure 12:
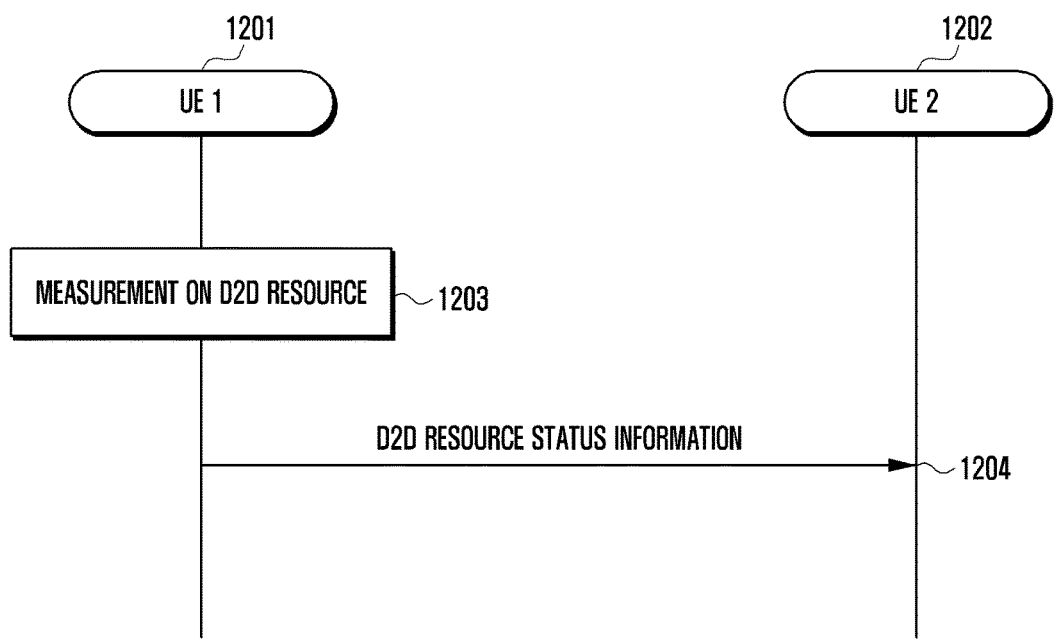
FIG. 12 is a signal flow diagram illustrating signaling between a UE and an eNB according to an embodiment of the present disclosure.

FIG. 12 illustrates a signaling procedure between a UE and an eNB according to an embodiment of the present invention.

Referring to FIG. 12, the UE 1201 generates the D2D resource status information through measurement on the D2D resource in the D2D resource status information acquisition process 1203 and reports the D2D resource pool status information to the eNB 1202 through signaling as denoted by reference number 1204. The D2D resource status information reported through the signaling 1024 and the conditions for the UE to perform the signaling 1204 have been described above.

The transceiver 1110 performs signaling with the UE in the connected mode, and transmits system information to the UEs within the cell. The controller 1120 may include a discovery resource adjuster 1122 for performing steps 1001-1003 of FIG. 10, and an information processor 1124 for transmitting information on the changed discovery resource and allocating the discovery signal resource to the UE. The storage unit 1130 may store various information and programs necessary for the operations of the eNB, according to an embodiment of the present invention.

As described above, the method and apparatus for communicating the signal for D2D communication in a wireless communication system, according to embodiments of the present invention, allow a terminal to be allocated the discovery signal transmission resource for D2D communication through signaling with the base station so as to make it possible to allocate a radio resource to a plurality of terminals.

In the above described embodiments of the present invention, the operations are selectively performed or omitted. In each embodiment of the present invention, the operations are not necessary to be performed in the sequential order as depicted but may be performed in a changed order.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for device-to-device (D2D) communication in a terminal of a wireless communication system, the method comprising:
   receiving, from a base station, a D2D communication initiation message;
   measuring strength of a received signal on a radio resource for transmitting a discovery signal used in the D2D communication;
   transmitting, to the base station, a measurement report of the strength of the received signal;
   receiving, from the base station, information on allocation of a first resource in the radio resource for transmitting the discovery signal to another terminal for the D2D communication,
   wherein the first resource for transmitting the discovery signal is allocated based on the measurement report;
   transmitting the discovery signal on the first resource; and
   transmitting the discovery signal on a second resource, if an operation state of the terminal is changed from a connected state to an idle state and if the first resource is unavailable,
   wherein the second resource is selected by the terminal based on monitoring the radio resource and selecting a resource having the lowest received signal strength in the radio resource.

2. The method of claim 1, wherein the D2D communication initiation message comprises information on the radio resource.

3. The method of claim 1, further comprising receiving information on the radio resource through one of a system information block (SIB) broadcast and higher layer signaling from the base station.

4. The method of claim 1, further comprising transmitting a D2D communication request message to the base station.

5. The method of claim 1, wherein measuring the strength of the received signal and transmitting the measurement report are performed at a predetermined interval.

6. The method of claim 1, further comprising:
   transitioning the operation state of the terminal to an the idle state;
   performing cell selection as the terminal moves;
   receiving region information of the D2D communication from a new base station determined through cell selection; and
   transmitting, if region information received from the new base station matches region information of the base station, the discovery signal using the first resource allocated by the base station lastly.

7. The method of claim 1, further comprising:
   determining whether the terminal is in the idle state; and
   selecting, if the terminal is in the idle state, the second resource for use in transmitting the discovery signal in the radio resource.

8. The method of claim 7, wherein the radio resource comprises a first radio resource for the terminal in the connected state and a second radio resource for the terminal in the idle state, and
   selecting the second resource comprises determining the resource for use in transmitting the discovery signal in the second radio resource for the terminal in the idle state.

9. The method of claim 8, wherein information on the second radio resource for the terminal in the idle state is received in a SIB.

10. A method for supporting device-to-device (D2D) communication in a base station of a wireless communication system, the method comprising:
    transmitting, to a terminal, a D2D communication initiation message;
    receiving, from the terminal, a measurement report of strength of a received signal at the terminal on a radio resource for transmitting a discovery signal used in the D2D communication;

allocating a first resource in the radio resource for transmitting a the discovery signal from the terminal to another terminal for the D2D communication based on the measurement report,
wherein the discovery signal is transmitted on the first resource,
wherein the discovery signal is transmitted on a second resource if an operation state of the terminal is changed from a connected state to an idle state and if the first resource is unavailable, and
wherein the second resource is selected by the terminal based on monitoring the radio resource and selecting a resource having the lowest received signal strength in the radio resource.

11. The method of claim 10, wherein the D2D communication initiation message comprises information on the radio resource.

12. The method of claim 10, further comprising transmitting information on the radio resource to the terminal through one of a system information block (SIB) and higher layer scheduling.

13. The method of claim 10, wherein the D2D communication initiation message is transmitted in response to a D2D communication request message received from the terminal.

14. The method of claim 10, wherein the radio resource comprises a first radio resource for the terminal in the connected state and a second radio resource for the terminal in the idle state, information on the radio resource for the terminal in the idle state is transmitted in a SIB, and information on the radio resource for the terminal in the connected state is transmitted through higher layer signaling.

15. The method of claim 10, further comprising:
measuring strength of a received signal on the radio resource;
adjusting a size of the radio resource according to the measured strength of the received signal; and
transmitting information on the adjusted size of the radio resource to the terminal.

16. A terminal for device-to-device (D2D) communication in a wireless communication system, the terminal comprising:
a transceiver configured to transmit and receive signals to and from a base station and other terminals; and
a controller configured to control to receive a D2D communication initiation message from the base station, measure strength of a received signal on a radio resource for transmitting a discovery signal used in the D2D communication, transmit a measurement report of the strength of the received signal to the base station, receive information on allocation of a first resource in the radio resource for transmitting the discovery signal to another terminal for the D2D communication from the base station,
wherein the first resource for transmitting the discovery signal is allocated based on the measurement report, transmit the discovery signal on the first resource and transmit the discovery signal on a second resource, if an operation state of the terminal is changed from a connected state to an idle state and if the first resource is unavailable,
wherein the second resource is selected by the terminal based on monitoring the radio resource and selecting a resource having the lowest received signal strength in the radio resource.

17. The terminal of claim 16, wherein the D2D communication initiation message comprises information on the radio resource.

18. The terminal of claim 16, wherein the controller is further configured to control to receive information on the radio resource through one of a system information block (SIB) broadcast and higher layer signaling from the base station.

19. The terminal of claim 16, wherein the controller is further configured to control to transmit a D2D communication request message to the base station.

20. The terminal of claim 16, wherein the controller is further configured to control to measure the strength of the received signal and transmit the measurement report at a predetermined interval.

21. The terminal of claim 16, wherein the controller is further configured to control transition of the operation state of the terminal to an the idle state, perform cell selection as the terminal moves, receive region information of the D2D communication from a new base station determined through cell selection, and transmit, if region information received from the new base station matches region information of the base station, the discovery signal using the first resource allocated by the base station lastly.

22. The terminal of claim 16, wherein the controller is further configured to control to determine whether the terminal is in the idle state, and select, if the terminal is in the idle state, the second resource for use in transmitting the discovery signal in the radio resource.

23. The terminal of claim 22, wherein the radio resource comprises a first radio resource for the terminal in the connected state and a second radio resource for the terminal in the idle state, and the controller is further configured to determine the second resource for use in transmitting the discovery signal in the second radio resource for the terminal in the idle state.

24. The terminal of claim 23, wherein information on the second radio resource for the terminal in the idle state is received in a SIB.

25. A base station for supporting device-to-device (D2D) communication in a wireless communication system, the base station comprising:
a transceiver configured to transmit and receive signals to and from a terminal; and
a controller configured to control to transmit a D2D communication initiation message to a terminal, receive a measurement report of strength of a received signal at the terminal on a radio resource for transmitting a discovery signal used in the D2D communication from the terminal, and allocate a first resource in the radio resource for transmitting a the discovery signal from the terminal to another terminal for the D2D communication based on the measurement report,
wherein the discovery signal is transmitted on the first resource, and
wherein the discovery signal is transmitted on a second resource, if an operation state of the terminal is changed from a connected state to an idle state and if the first resource is unavailable, and
wherein the second resource is selected by the terminal based on monitoring the radio resource and selecting a resource having the lowest received signal strength in the radio resource.

26. The base station of claim 25, wherein the D2D communication initiation message comprises information on the radio resource.

27. The base station of claim 25, wherein the controller is further configured to control to transmit information on the radio resource to the terminal through one of a system information block (SIB) and higher layer scheduling.

28. The base station of claim 25, wherein the D2D communication initiation message is transmitted in response to a D2D communication request message received from the terminal.

29. The base station of claim 25, wherein the radio resource comprises a first radio resource for the terminal in the connected state and a second radio resource for the terminal in the idle state, information on the radio resource for the terminal in the idle state is transmitted in a SIB, and information on the radio resource for the terminal in the connected state is transmitted through higher layer signaling.

30. The base station of claim 25, wherein the controller is further configured to measure strength of a received signal on the radio resource, adjust a size of the radio resource according to the measured strength of the received signal, and transmit information on the adjusted size of the radio resource to the terminal.

\* \* \* \* \*